Sept. 13, 1960

W. S. RICHARDSON 2,952,347

CONTROL MECHANISM

Filed Oct. 7, 1957

INVENTOR.
William S. Richardson
BY
Quarles & French
Attorneys

Sept. 13, 1960 W. S. RICHARDSON 2,952,347
CONTROL MECHANISM
Filed Oct. 7, 1957 4 Sheets-Sheet 3

INVENTOR.
William S. Richardson
BY
Quailes & French
Attorneys

United States Patent Office 2,952,347
Patented Sept. 13, 1960

2,952,347

CONTROL MECHANISM

William S. Richardson, Fox Point, Wis., assignor to The Falk Corporation, Milwaukee, Wis., a corporation of Wisconsin Filed Oct. 7, 1957, Ser. No. 688,748

9 Claims. (Cl. 192—.098)

The invention relates to control mechanism and more particularly to mechanism controlling air-operated clutches used in marine transmissions and capable of being controlled from any suitable or desired location in the ship.

One object of the invention is to provide a pilot valve control for the main air valve supplying air to the clutch, which pilot valve can be readily remotely controlled either by mechanical, oil or electrical control mechanisms, either single or multiple.

A further object of the invention is to provide a control mechanism for air-operated clutches in which the air supply for the clutches is direct from the air supply through the valves to the clutches without detour to the control station and is also connected with the engine governor actuator so that the clutches are operated with the engine at idling speed.

A further object of the invention is to provide a control mechanism which will not operate to engage the clutch when the supply pressure is below that required for efficient operation of the clutches and which will permit the clutch to automatically disengage at such lower pressures.

A further object of the invention is to provide an emergency manually operated control for the control mechanism or one which may be used if the air pressure is below a predetermined value.

A further object of the invention is to provide a cross interlock between the control valves of the mechanism that prevents one clutch engaging until the other is released.

A further object of the invention is to provide a clutch control mechanism for air-operated clutches in which the inflation rate is designed to provide a soft initial engagement followed by rapid inflation to minimize slip and having quick opening exhaust valves to reduce the time required to disengage the clutches.

A further object of the invention is to associate with the clutch control mechanism above described a double check valve and interlocking relay that prevents the engine speed actuator from functioning until the clutch is engaged.

A further object of the invention is to provide a clutch control mechanism of compact construction that may be mounted as a unit in the desired location and eliminate the use of separate pipes and control valves.

The invention further consists in the several features hereinafter described and more particularly defined by claims at the conclusion hereof.

Figure 2:
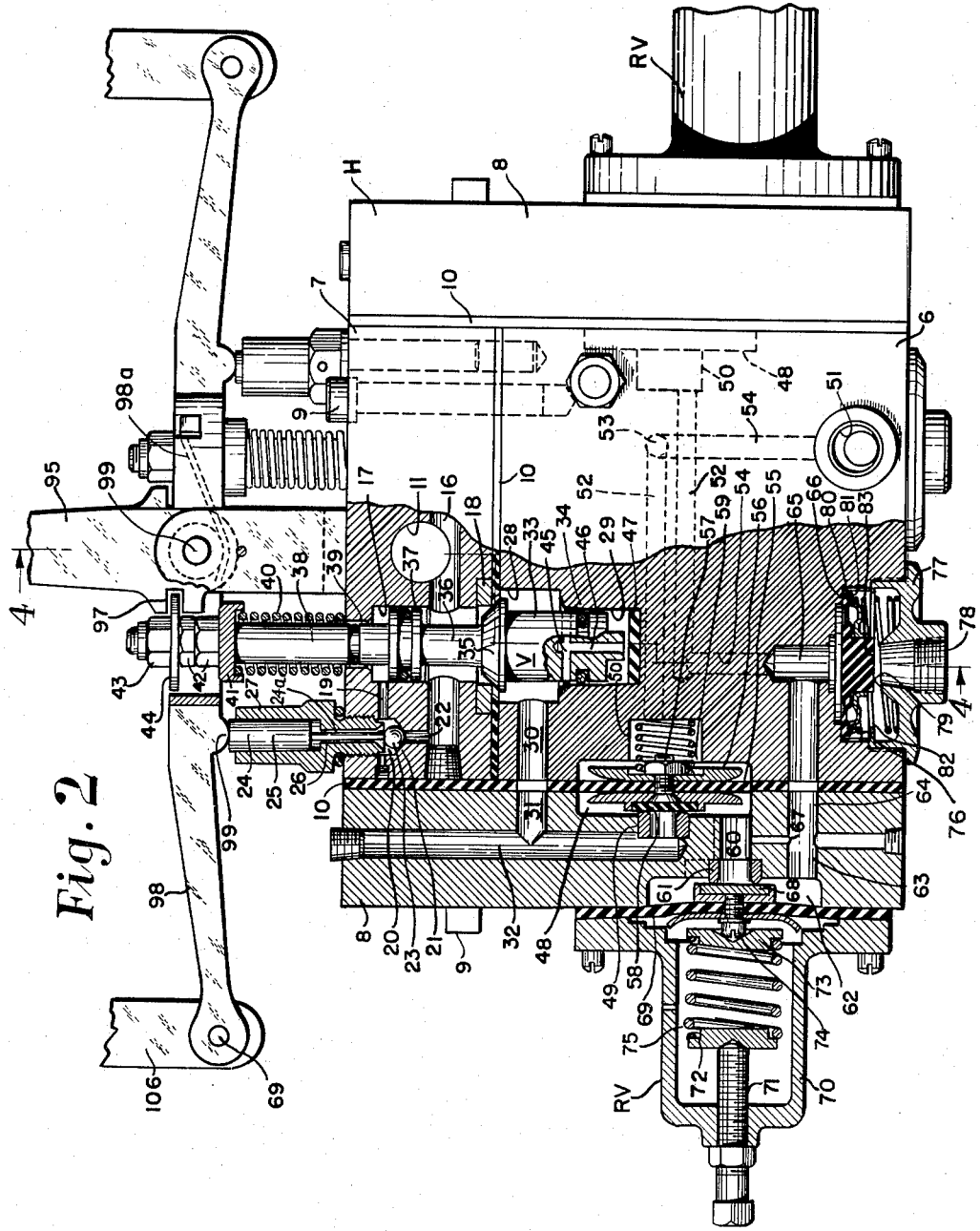
Fig. 2 is a front elevational view of control mechanism embodying the invention, parts being broken away and parts being shown in section.
Figure 3:
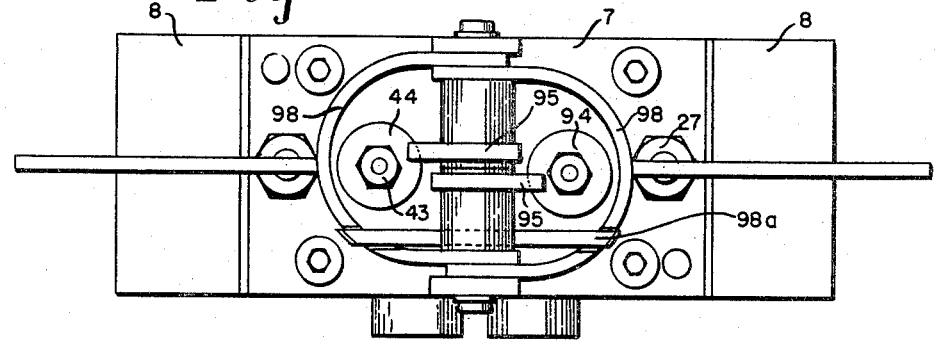
Fig. 3 is a top view of the housing of the control mechanism.

Referring to Fig. 2, the control mechanism includes a housing H formed of a lower body block 6, an upper body block 7 and similar end blocks 8, these blocks being suitably secured together by screws, such as the cap screws 9, the joints between the blocks being sealed by strips 10 of suitable sealing material interposed between the blocks.

Figure 4:
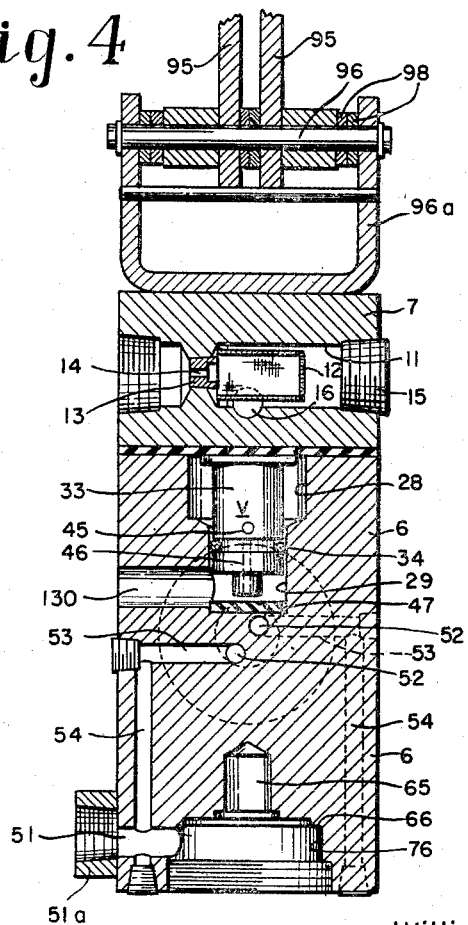
Fig. 4 is a vertical sectional view through the housing of the control mechanism taken on the broken line 4—4 of Fig. 2, parts being omitted.

The upper block 7 has, as shown in Figs. 2 and 4, a transversely extending passage including a large bore 11 having air filter screen 12 mounted therein and a smaller bore having an apertured plug 13 mounted therein providing a restricted inlet 14 to the bore 11 from the air supply, the outer end of the bore 11 being sealed off by a plug 15. Block 7 also has a lengthwise extending bore 16 that intersects the bore 11 to supply compressed air to oppositely disposed vertical bores 17, one at one side of the bore 11 being shown, and the other not shown being similiar and similarly spaced from bore 11. The lower end of each bore 17 is provided with a valve seat insert ring 18. At its upper end each bore 17 has a passage 19 leading therefrom to a chamber 20 having a valve seat 21 surrounding the upper end of a passage 22 connecting this chamber with the bore 16, one of these chambers being shown in section adjacent one end of the block, the other chamber being similar and disposed adjacent the other end of said block.

In each instance, a pilot ball valve 23 is normally seated on the seat 21 by the weight of a lever hereinafter described acting on a gravity actuated plunger 24 working in differential diameter bores 25 and 26 in a housing member 27 in threaded engagement with the upper end of the chamber 20, the lower end 24a of said plunger being of reduced cross section.

The lower block 6 has sets of concentric differential diameter bores 28 and 29 that are axially alined with the bores 17, the larger diameter bores 28 being also larger than the bores 17 and each communicating with a bore 30 which at 31 is extended into each end block 8 to connect with a vertically disposed bore 32 therein, said bore 32 having its upper end sealed by a plug as shown in Fig. 2.

A control valve V works, in each instance, in each set of alined bores 17, 28 and 29. Each valve has a piston portion 33 provided with a sealing ring 34 and working in the bore 29, a conical valve head 35 adapted to seat on the ring 18, a reduced diameter portion 36, a ring sealed piston portion 37 working in the bore 17 and a sealed stem portion 38 working in a bore 39 concentric with bore 17. The stem portion 38 projects upwardly beyond the housing and is normally moved to closed position by a spring 40 interposed between the housing and a spring seat washer 41 on the valve stem secured thereto by a pair of nuts 42 between the upper of which and a third nut 43 a disc 44 is mounted. The piston portion 33 has a cross bore 45 communicating with the bore 28 when the valve is closed and connected by a centrally disposed vertical bore 46 with the lower end of the bore 29, said valve adjacent the lower end of the bore 46 having a seat surface adapted when the valve is open to engage a yieldable seat disc 47 at the lower end of the bore 29 to seal the space at the lower end of bore 29 below the piston portion 33 when the valve is open but permitting venting of this space when the valve is closed, such venting taking place through bore 130 (Fig. 4), which communicates with the atmosphere.

As will appear from subsequent description, chamber 28 is filled with air when valve V is open. Under these conditions passage 46 is sealed by pressing against yieldable disc 47, thus sealing cross bore 45 and preventing the loss of pressure from chamber 28. When the valve V closes, however, chamber 28 (and bores 30, 31 and 32) are vented to the atmosphere through passages 45, 46 and 130 (Fig. 4). Such venting clears these lines so that residual pressures cannot build-up to hinder the operation of valve V.

Each end block 8 and adjacent portions of the block 6 are recessed to provide a chamber 48. One side of each chamber communicates through an orifice fitting 49 of predetermined diameter with the bore 32 in the associated end block. The other side of each chamber 48 connects with a bore 50 which connects with an air transmission pipe passage 51 for the other supply connection by connecting bores 52, 53 and 54.

A diaphragm mounted valve works in each chamber 48. It includes a portion 55 of one of the sealing strips 10 and metal discs 56 clamped thereto by a screw bolt 57, one of the discs having a valve seat insert 58 normally seated on the exposed end of the fitting 49 by a spring 59 interposed between the other disc and the bottom of the bore 50.

Each end block 8 has a passage 60 leading from the lower end of the chamber 48 and having an orifice fitting 61 of predetermined diameter opening into a recess 62 which connects by alined passages 63 and 64 in said block and the block 6 with an outlet passage 65 which at its lower end is enlarged to provide a valve seat 66. An air bleed passage 67 also connects the passage 60 with the passage 63. Immediately below and coaxial with passage 67 is an unnumbered bore, it being understood that said bore is closed off by a plug in its threaded end, such bore providing access for drilling the bleed passage 67. A pressure regulating valve RV is mounted on each end block and controls the flow of air past the orifice 61. This valve includes a valve member 68 mounted on a flexible diaphragm 69 clamped at its periphery between the adjacent block 8 and a valve housing member 70 which has a load regulating screw 71 adjustably mounted therein and bearing at its inner end on a spring seat member 72 which cooperates with a similar seat member 73 bearing on a valve securing screw 74 to receive the valve closing spring 75 between them so that by the tensioning of the spring by the adjustment of the screw the valve 68 will be held closed to open at a predetermined pressure.

The seat 66 for each outlet is at the inner end of a bore 76 which has an apertured cap 77 in threaded engagement therewith, said cap having an exhaust air opening 78 having a seat at its upper end. An outlet valve 80, of rubber or other suitable yieldable material, has a flexible disc rim portion that is normally held against the seat 66 by a spring seat washer 81 and a spring 82 interposed between said washer and the cap 77 and the main body of said valve has a seat projection 83 adapted to seat on the seat 79. With this valve pressure air acting on the front face of the valve initially acts to move the main body of the valve outwardly so that the projection 83 seats on seat 79 to close off the exhaust opening 78, and thereafter this pressure acts to move the flexible rim portion of said valve off the seat 66, and then since the area of the head end of the valve is greater than the annular area between the rim of the valve and the projection 83, the valve stays open until on a reduction in pressure the spring 82 can return the valve 80 to its closed position.

Figure 5:
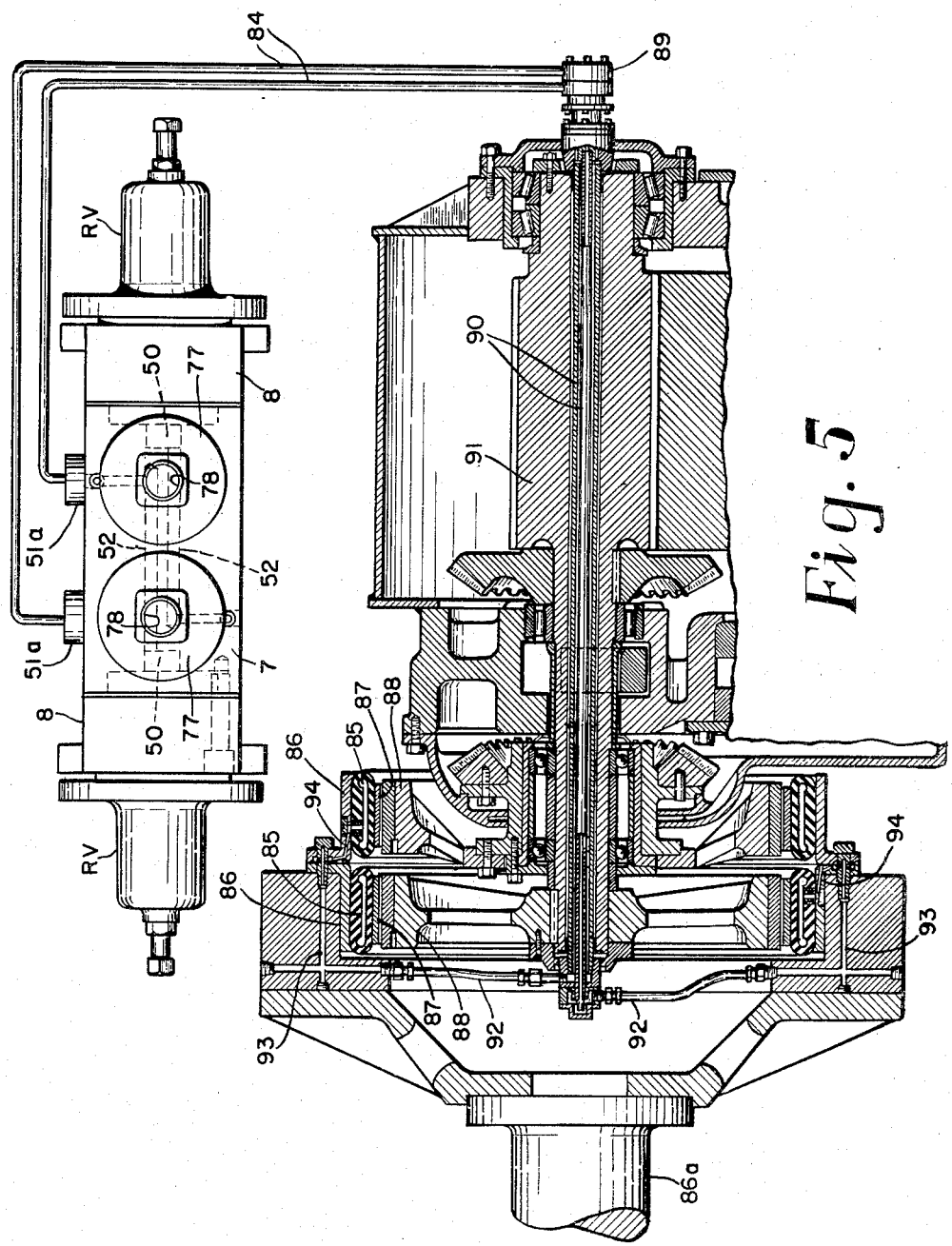
Fig. 5 is a bottom plan view of the housing with connections to the air-operated clutches for a marine transmission mechanism shown in vertical section with parts broken away.

The bore 76 connects with the passage 51 which has a pipe connection extension 51a. Referring to Fig. 5, each outlet including its extension 51a is connected by a pipe 84 with the clutch to be operated.

The clutches to be driven each include a continuous rubber tube 85, one side of which is bonded to a clutch housing 86 connected with the propeller shaft 86a, and carrying a series of arc shaped metal clutch plates or shoes 87 on its inner side. Inflation of the tube 85 brings it into engagement with a drive drum 88 forming a part of the power transmission for the ship. In Fig. 5, which is a copy of parts shown in Fig. 1 of U.S. Patent No. 2,304,030, the left hand drum 88, acting through the clutch and housing 86, is driven by power shaft 86a in forward or ahead drive while the right hand drum 88, acting through the clutch and housing, drives through gearing, parts of which are shown in Fig. 5, the propeller shaft (not shown) in reverse or astern drive. Marine transmissions using air-operated clutches are known, and further details of such transmissions will be found, for example, in the prior U.S. Patents Nos. 2,304,030 and 2,304,031, dated Dec. 1, 1942, corresponding Canadian Patent No. 460,266, of Oct. 11, 1949, and British Patent No. 635,327, of Feb. 6, 1948. Fig. 5 is an abbreviated view of one of the above cited transmissions and indicates that the air supply from the pipes 84 connects with a rotary duel air conduit fitting 89 supplying air to pipes 90 extending through one of the shafts 91 of the transmissions and then connected by separate pipes 92 to passages 93 formed in the housing 86 and connected to passages 94 leading into the interior of the tubes 85.

In case of an emergency or when the air pressure in the system is low, each valve V may be manually operated by a hand lever 95, pivotally mounted on a transversely disposed supporting shaft 96 and having a notched portion 97 to engage the disc 44 on the stem of the valve.

Normally the operation of the valves V are in each instance controlled by the operation of its associated pilot valve 23. In each instance, a forked lever 98, pivotally mounted on the shaft 96, carried by a bracket 96a, has a foot 99 bearing on the extended end of the plunger 24 of the associated pilot valve. When said lever 98 is released from the plunger 24 or is moved upwardly, the plunger 24 is free to move under air pressure exerted against its differential area so that said valve 23 can then move to open position. A spring 98a normally acts to hold each lever 98 in engagement with its associated plunger 24. The levers 98 may be selectively operated by any suitable remote control mechanism, either mechanical, hydraulic or electrical, and for the purpose of illustration I have shown in Fig. 1 a mechanical mechanism for this purpose.

At any suitable location in the ship, usually in the pilot house, a control lever 100 is mounted to swing relative to a fixed housing 101 and connected to turn a shaft 102 journalled in said housing and having an extension carrying a sprocket 103. A chain 104 is trained over the sprocket 103 and its ends are connected, in each instance, by a cable 105 to one end of an adjustable link 106 whose other end is connected by a pin 99 with the outer end of the lever 98 mounted as above described on the housing H which may be placed in the engine room of the ship. Swinging of lever 100 to either side of its central position acts to lift one or the other of said levers 98 to permit the associated pilot valve to function.

A reservoir or tank T for compressed air at the desired pressure is connected by a pipe 107 to the inlet of the housing H to supply air through the plug 13 to the bore 11. A branch pipe 108 leads to the housing 101 where it connects with a variable air pressure regulator SR of known construction and the details of which are not the subject of the present invention, said regulator including an actuator pin 109 adapted to be engaged by a cam projection 110 on the lower end of the control lever 100 so that when said lever is in its mid-position, the regulator closes off the supply of air from the pipe 108 to a pipe 111, but as the lever 100 is moved to either side of this mid-position for ahead or astern, the cam 110 moves the actuator pin 109 to gradually increase the flow of compressed air through the pipe 111.

The pipe 111 connects with a passage 112 in the housing 113 of an interlock relay valve mechanism IR, said passage being controlled by a valve 114 whose stem 115 extends through a partition in the housing 113 and is anchored to a flexible diaphragm 116 closing off a cavity 117 in which a spring 118 is disposed to act on said diaphragm to normally close the valve 114. The valve 114 controls the flow of compressed air from the passage 112 to a chamber 119 connected by a pipe 120 with the cylinder 121 of a speed governing actuating device D for the engine or other prime mover. The loading of the valve 114 by the spring is such that this valve is held closed while either of the air operated clutches are being applied.

The device D includes a piston 122 working in the cylinder 121 and urged by a spring 123 to move through its rod end and a pivotally supported speed control actuator lever 124 to its "power off" position and is moved in the opposite direction by compressed air from the tank T to move lever 124 to increase the speed of the power unit as the operator's control lever 100 is swung to either side of its mid-position for ahead or astern running of the ship. As in known constructions the lever 124 acts to vary the operation of the governor for the power unit, said governor either acting to control the fuel supply to an internal combustion engine or suitable control valve mechanism for a steam engine or steam turbine.

A cap 125 on the valve mechanism IR forms a pressure chamber 126 above the diaphragm 116 which connects by a pipe 127 with a cylinder 128 having a double check or shuttle valve 129 working therein. One end of cylinder 128 connects by a pipe 131 with the pipe 84 for the left hand or ahead drive clutch, and the other end of said cylinder connects by a pipe 132 with the pipe 84 for the right hand or astern drive clutch previously referred to.

Figure 1:
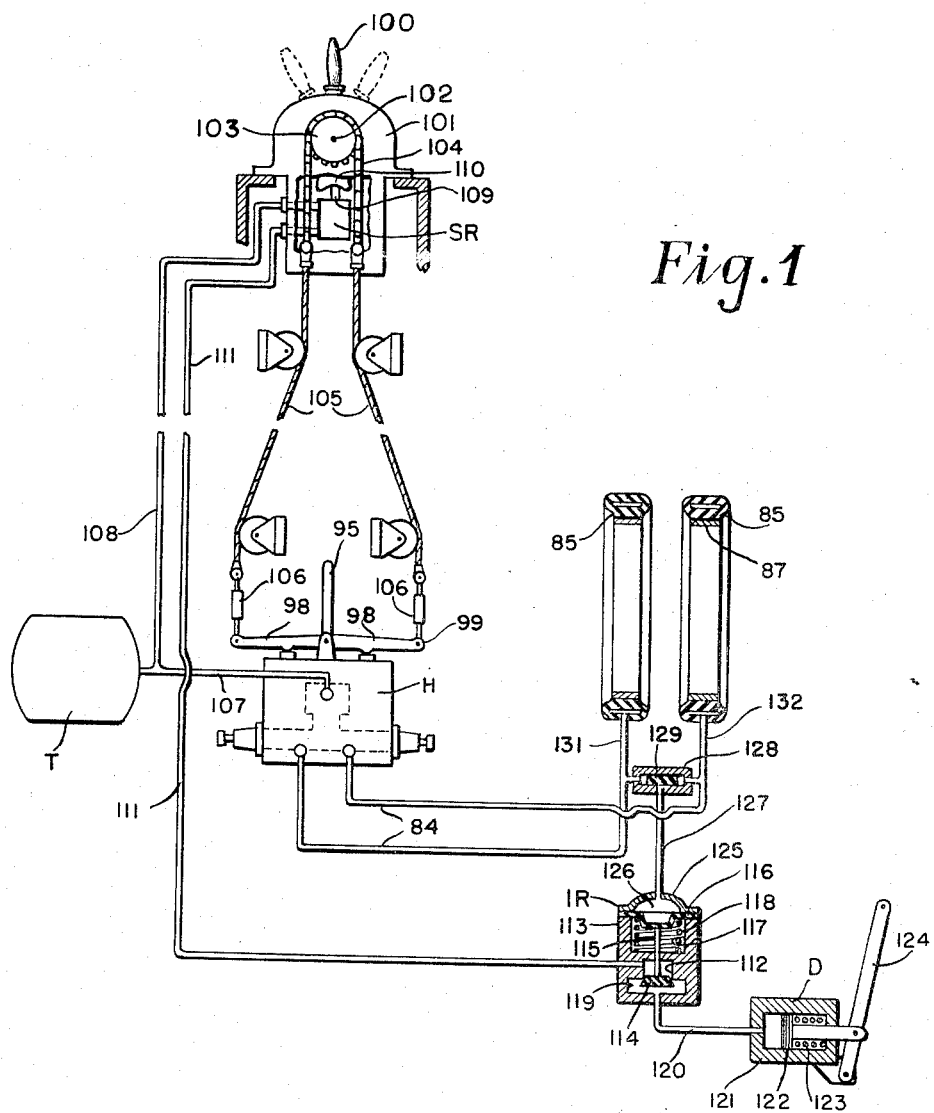
Fig. 1 is a diagrammatic view showing the control mechanism associated with other parts used to control the air operated clutches, parts being shown in section.

With the above construction and, assuming that the operator wants the ship to proceed ahead, he swings the lever 100 from its mid-position as viewed in Fig. 1 toward the right and through shaft 102, gear 103, chain 104, left hand cable 105, link 106 raises the left hand lever 98. This as previously noted allows the pilot valve 23, shown in full in Fig. 2, to open. Compressed air from the tank T then passes through the passages heretofore described to passages 11, 16, 22, chamber 20 and passage 19 to the upper end of the bore 17 to act on the upper end of the piston 37 to move the valve V to its open position against the loading of the spring 40, it being noted that before opening air pressures acting on valve head 35 and the lower end of piston 37 are balanced. As soon as the valve V opens, the air pressure then acting on the larger diameter of the valve head 35 keeps it open. Opening of the valve V allows compressed air to pass to chamber 28, through alined passages 31 and 30 and passage 32 to the orifice 49, and if there is no cross interference with air pressures in the system for the other clutch, acts to open valve 58 against the loading of its spring 59 to allow supply air to pass into chamber 48 and through passage 60 and orifice 61 to open valve 68. But before valve 68 opens, the supply air can pass through the bleed or restricted passage 67 into the alined passages 63 and 64, the passage 65 acting on the outlet valve to first move its body portion to seat projection 83 on the exhaust outlet seat 79 and thereafter move the disc portion of valve 80 slightly off its seat 66 to allow the supply air to pass through the pipe 84 connected with the tube 85 for the ahead clutch to gradually start its inflation and on the build up in pressure in the line ahead of the valve 68 open said valve to fully inflate the tube 85 to apply the clutch. During this time the valve 114 remains closed, but with the clutch applied, the air pressure in this pipe 84 for the ahead clutch has shifted the shuttle valve 129 so that air from this pipe can pass therefrom through pipe 131 to cylinder 128 and thence by pipe 127 to chamber 126 where at the end of inflation of tube 85 it acts on the diaphragm 116 to overcome the loading of the spring 118 to open valve 114 so that now as the operator continues to swing the lever 100 to the right, the air from the tank T can pass via pipe 108, regulator SR, then under the control of the cam 110, pipe 111, passage 112, through open valve 114, chamber 119, pipe 120 to cylinder 121 to act on the piston 122 of the actuating device D and swing the lever 124 toward the right against the action of the spring 123 to act on the governor so that the power unit is started and speeds up, the speed of this unit increasing until lever 100 reaches the end of its swinging movement toward the right. If in swinging the lever 100 to the right the pressure in the system of the other valve has not been lowered so that the other tube 85 for the astern clutch is not deflated, then this air pressure in conjunction with the spring 59 acts on the right hand side of the diaphragm in chamber 48 to hold the valve 58 closed until the astern clutch is fully deflated after which the valve 58 can open and the other events previously mentioned take place to operate the air-operated ahead drive clutch.

The application of the air-operated astern drive clutch is similar to that above described for the ahead drive clutch, the valves and passages being duplications of those shown in full in Fig. 2, and in this case the pilot valve for controlling this clutch is permitted to operate when the operator shifts the lever 100 toward the left and through a cycle, similar to that previously described, the inflation of the right hand tube 85 and its accompanying application of the right hand or astern clutch is effected. In this instance, the shuttle valve 129 is shifted toward the left as viewed in Fig. 1 to admit air from the other pipe 84 to the pipe 132 and cylinder 128. Also under these conditions the cross over connection including the pipes 54 and 52 shown in dotted lines in Fig. 4 and connecting the air supply for the ahead valve system with the bore 50, shown in dotted lines in Fig. 2, acts on the diaphragm supported valve, identical with the valve 58 to prevent the passage of air to the air-operated astern drive clutch until the tube 85 for the ahead drive clutch has been deflated.

It is to be noted that when either of the pilot valves 23 are permitted to open so that air supply pressure can operate to open their associated valve V, if this air supply pressure is not sufficient to overcome the loading of the closing spring 40, then the valve V will not open and the clutch will not be operated until the tank pressure is brought up to the predetermined operating pressure, and that under these conditions the valve can be opened manually, if necessary, by the movement of its associated hand lever 95 and that also either one of these hand levers 95 can be operated to open their associated valve in the case of an emergency.

After the opening of either main valve V, the setting of the associated pressure regulator valve RV determines the actual operating air pressure for the associated air-operated clutch.

The bleed passage 67 in each air supply system permits a soft initial engagement of the air-operated clutch followed on the opening of the valve 68 by a rapid inflation to minimize slip.

The interlocking relay mechanism IR prevents the speed actuator D from functioning until the clutch is engaged, which occurs at idling speed of the power unit.

I desire it to be understood that this invention is not to be limited to any particular form or arrangement of parts except in so far as such limitations are included in the appended claims.

What I claim as my invention is:

1. In marine propulsion apparatus including air-operated clutches for selectively establishing ahead and astern drive, control mechanism for selectively controlling said clutches, said mechanism including a source of operating compressed air, a housing connected with said source and having passages therein for connection with each of said clutches, a control valve controlling the flow of operating air through the passages connected with one of said clutches, a control valve controlling the flow of operating air through the passages connected with the other of said clutches, each of said control valves being normally closed but adapted to be opened by the pressure of said operating air, a pilot valve associated with each of said control valves and controlling the passage of said operating air to open its control valve, remote controlled mechanism for controlling the operation of said pilot valves, a chamber operatively associated with each of the aforesaid passages, each said chamber containing a normally closed valve operatively associated with a diaphragm having air spaces on opposite sides thereof and dividing said chamber into compartments, said valve working in one of said compartments to normally block the passage of air therethrough to its associated clutch, the other compartment being connected by cross passages in the housing with the air supply passage for the other clutch to provide means for preventing the opening of the last mentioned valve until the other clutch is released.

2. The control mechanism as defined in claim 1, wherein each control valve is normally closed by a spring loaded to permit opening of the valve by operating air at a predetermined pressure.

3. The control mechanism as defined in claim 1, wherein the remote control mechanism includes a lever swingable from a mid-position to either side thereof to selectively operate said pilot valves.

4. The control mechanism as defined in claim 1, in which the air supply is also associated with an engine speed governor actuating device, and means for preventing the operation of said device until one of the clutches is applied.

5. The control mechanism as defined in claim 1, wherein means are provided for directly operating the control valves controlling the flow of operating air to the clutches.

6. The control mechanism as defined in claim 1, wherein each of the valve controlled passages is provided with a pressure regulated valve in advance of its outlet and a bleed passage in advance of said last named valve to provide a soft initial engagement of its associated air-operated clutch by air flowing through said bleed passage and a rapid inflation of said air-operated clutch on the opening of said last named valve.

7. The control mechanism as defined in claim 1, wherein each of the valve controlled passages has a check valve controlled outlet and a chamber into which said check valve opens connected with its associated air-operated clutch, said chamber having an exhaust outlet to permit deflation of its associated clutch, said check valve having a part adapted to close said exhaust outlet in advance of the opening of said check valve.

8. The control mechanism as defined in claim 4, wherein the means for preventing the operation of said engine speed governor actuating device is a spring closed valve in the air supply line to said device, and air pressure operated means is connected with the pressure air supply to either of said clutches to open said last named valve after a clutch application has been made to permit said engine speed governor actuating device to function.

9. The control mechanism as defined in claim 8, in which the air supply to said spring closed valve includes a double check valve operable to establish connection to the air supply for either clutch to the air pressure operated valve opening means.

References Cited in the file of this patent

UNITED STATES PATENTS

| | | |
|---|---|---|
| 2,396,231 | Brill | Mar. 12, 1946 |
| 2,571,451 | Humiston | Oct. 16, 1951 |
| 2,580,367 | Stevens | Dec. 25, 1951 |